United States Patent [19]

Bota et al.

[11] Patent Number: 4,899,624

[45] Date of Patent: Feb. 13, 1990

[54] CONTROL OF AN AUTOMATIC VEHICLE POWER TRANSMISSION

[75] Inventors: Keiji Bota; Tomoo Sawasaki, both of Hiroshima, Japan

[73] Assignee: Mazda Motor Corporation, Hiroshima, Japan

[21] Appl. No.: 183,246

[22] Filed: Apr. 19, 1988

[30] Foreign Application Priority Data

Apr. 23, 1987 [JP] Japan .................................. 62-101045

[51] Int. Cl.$^4$ .............................................. B60K 41/06
[52] U.S. Cl. ......................................... 74/868; 74/862
[58] Field of Search ........................... 74/862, 867, 868

[56] References Cited

U.S. PATENT DOCUMENTS

| 3,727,487 | 4/1973 | Forster et al. ...................... 74/867 X |
| 3,855,880 | 12/1974 | Ishimaru et al. ....................... 74/868 |
| 3,859,873 | 1/1975 | Miyauchi et al. ...................... 74/867 |
| 4,296,652 | 10/1981 | Oberpichler et al. ................. 74/868 |
| 4,501,173 | 2/1985 | Honing ................................... 74/868 |
| 4,680,989 | 7/1987 | Sykora et al. .......................... 74/867 |
| 4,779,491 | 10/1988 | Fujiwara et al. ....................... 74/868 |
| 4,787,258 | 11/1988 | Yamamoto et al. .................... 74/866 |

FOREIGN PATENT DOCUMENTS

3542956 6/1986 Fed. Rep. of Germany .
61-1769 1/1986 Japan .

Primary Examiner—Dwight G. Diehl
Attorney, Agent, or Firm—Fleit, Jacobson, Cohn, Price, Holman & Stern

[57] ABSTRACT

A hydraulic control system for an automatic transmission including a pressure regulating valve responsive to a pilot pressure to produce a regulated line pressure which is applied through a switching valve to an actuator of a clutch. The switching valve is also responsive to the pilot pressure to allow the pilot pressure to be introduced to the actuator when the pilot pressure is below the predetermined value and passes the line pressure to the actuator when the pilot pressure is above the predetermined value.

8 Claims, 7 Drawing Sheets

CONTROL OF AN AUTOMATIC VEHICLE POWER TRANSMISSION

CROSS REFERENCE TO THE RELATED APPLICATION

The present application is related to U.S. Pat. No. 4,831,900 filed on Mar. 30, 1987 and entitled "CONTROL SYSTEMS FOR AUTOMATIC TRANSMISSION", U.S. Pat. No. 4,787,258 filed on Mar. 31, 1987 and entitled "CONTROL SYSTEMS FOR AUTOMATIC TRANSMISSION" and U.S. Pat. No. 4,747,323 filed on Nov. 3, 1986 and entitled "CONTROL OF A VEHICLE POWER TRANSMISSION".

BACKGROUND OF THE INVENTION

1. Field of the Invention

The present invention relates to a hydraulic control system for an automatic vehicle transmission, and more particularly to a control of a servo-actuators in a hydraulic control system for a vehicle transmission.

2. Description of the Prior Art

A conventional hydraulic control system for an automatic vehicle transmission includes hydraulically operated servo-actuators for effecting engagement or disengagement of friction devices such as clutches and brakes. In order to supply the actuators with an appropriate hydraulic pressure, the system is provided with a pressure regulating valve which produces a regulated line pressure. The line pressure is introduced through a control valve to the actuator to operate the same. In order to reduce any possible gear shift shock which may be produced when the servo-actuator is engaged, the hydraulic line leading to the actuator is provided with a pressure accumulator so that the hydraulic pressure which is to be introduced into the actuator is temporarily stored in the accumulator and applied to the servo-actuator. With this arrangement, it is expected that the pressure in the actuator is gradually increased to thereby effect a smooth engagement of the friction device which is associated with the servo-actuator. An example of such hydraulic control system is disclosed by the Japanese laid-open utility model 61-1769.

It has been experienced in the conventional system that the gear shift shock cannot be satisfactorily suppressed under certain circumstances. Since the pressure accumulator is sensitive to the fluidity of the hydraulic liquid, the rate of increase in the pressure in the actuator can change depending on the temperature of the hydraulic liquid and the gear shift shock may be produced under a condition where the pressure change can occur relatively quickly. In order to make the rate of pressure increase relatively slow irrespective of the temperature in the hydraulic liquid, the pressure accumulator may be of a large capacity. However, this solution is not recommendable because the accumulator of a larger capacity will make the transmission bulky. It should further be noted that in order to compensate for any possible manufacturing error in the servo-actuator in taking measures for suppressing the gear shift shock, the accumulator will have to be of different capacity. However, it is practically impossible to select an accumulator which is matched with the particular actuator mounted on each product.

It may be possible to design the pressure regulating valve so that the pressure regulating valve produces the hydraulic pressure which is suitable for the initial period of engagement of the servo-actuator. However, such design of the pressure regulator causes an increase in the range of pressure regulation so that precise pressure regulation will become difficult.

SUMMARY OF THE INVENTION

It is therefore an object of the present invention to provide a hydraulic control system for an automatic vehicle transmission in which gear shift shock can effectively be avoided irrespective of the condition of the hydraulic liquid.

Another object of the present invention is to provide a hydraulic control system for an automatic vehicle transmission in which gear shift shock can be avoided without providing a pressure accumulator.

A further object of the present invention is to provide a hydraulic control system for a vehicle transmission in which engagement of a friction device can be made substantially in a desired time period.

According to the present invention, the above and other objects can be accomplished by applying a servo-actuator in an initial period of engagement with a pilot pressure which is applied to the pressure regulator for providing the line pressure. More specifically, according to the present invention, the hydraulic control system includes a pressure regulating valve which is applied with a pilot pressure determined in accordance with a vehicle operating condition and produce a line pressure depending on the pilot pressure. To control the engagement of an actuator, the pilot pressure is at first applied to the actuator and thereafter the line pressure is applied.

Thus, according to the present invention, there is provided a hydraulic control system for an automatic vehicle transmission including hydraulic actuator means for friction means in said transmission, means for producing a pilot pressure in accordance with vehicle operating conditions, pressure regulating means for producing a regulated line pressure in accordance with the pilot pressure, hydraulic passage means provided between said pressure regulating means and said hydraulic actuator means, switching valve means provided in said hydraulic passage means and responsive to said pilot pressure to take a first position wherein it allows the pilot pressure to be applied to the actuator means when the pilot pressure is below a predetermined value and a second position wherein it allows the line pressure to be applied to the actuator means when the pilot pressure is above the predetermined value. A control valve may be provided in the hydraulic passage means between the switching valve means and the actuator means to control operations of the actuator means. The pilot pressure may be provided by solenoid valve means of a duty factor type in which the pressure is determined by the duty factor of the electric pulse applied to the solenoid.

According to the features of the present invention, shift shock can be suppressed effectively without using a pressure accumulator. For example, when the vehicle is not running and the transmission selector lever is shifted from the neutral position to one of the running positions, the pilot pressure can be determined as desired by appropriately determining the duty factor applied to the solenoid valve so that the friction device associated with the actuator means is engaged within a desired time period.

The above and other objects and features of the present invention will become apparent from the following descriptions of a preferred embodiment which will proceed hereinafter by way of example taking reference to the accompanying drawings.

DESCRIPTION OF THE PREFERRED EMBODIMENT

Figure 1A:
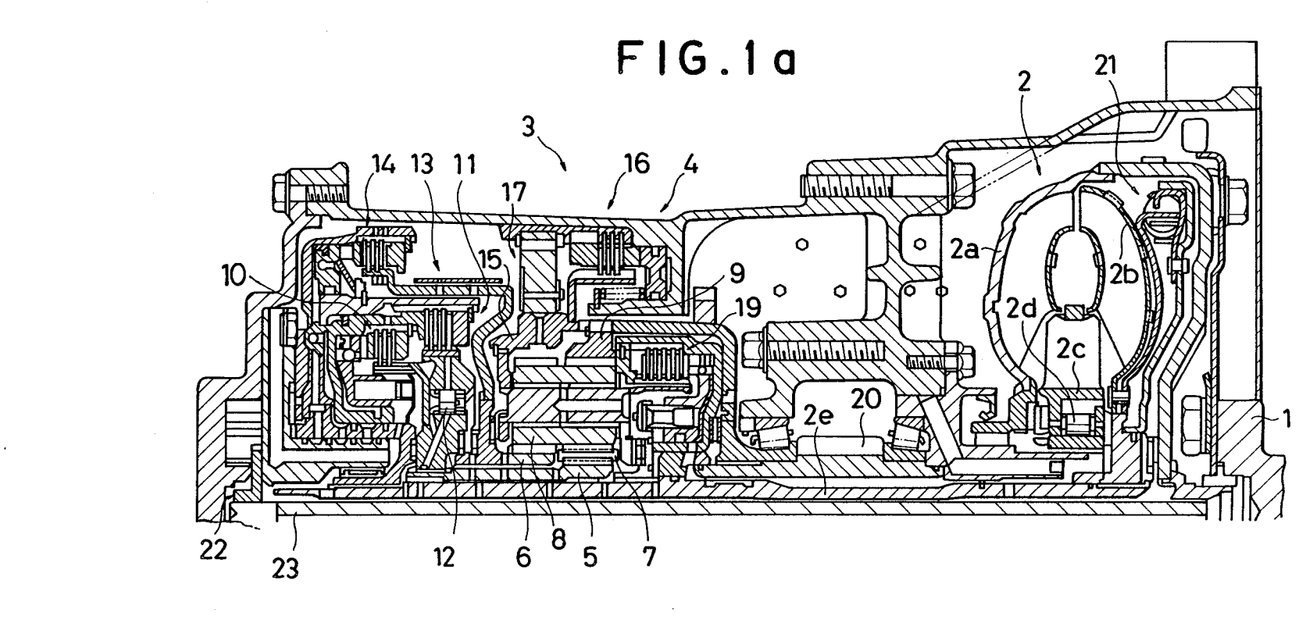
FIG. 1a is a sectional view of an automatic vehicle transmission to the present invention can be applied.
Figure 1B:
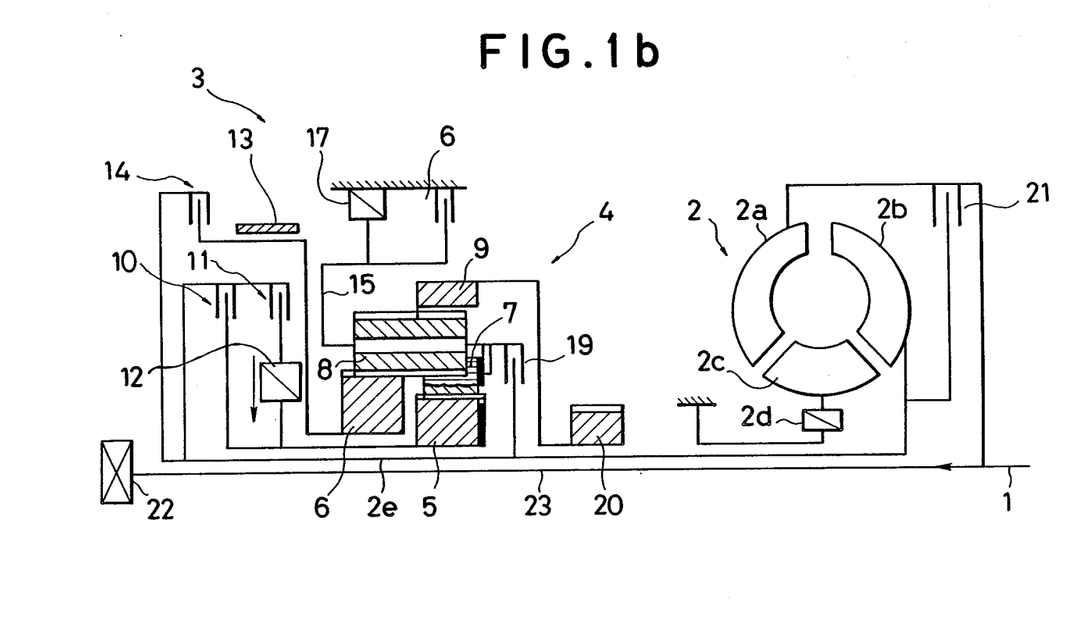
FIG. 1b is a diagrammatical illustration of the transmission showing the skelton of the transmission.

Referring to the drawings, particularly to FIG. 1, there is shown an automatic transmission including a hydraulic torque converter 2 having a pump 2a, a turbine 2b and a stator 2c. The pump 2a is connected with an engine output shaft 1 to be driven thereby. As well known in the art, the stator 2c is mounted in position by means of a oneway clutch 2d. The torque converter 2 further has an output shaft 2e which is connected with the turbine 2b.

The output shaft 2e of the torque converter 2 is connected with a multiple stage transmission gear mechanism 3 which includes a planetary gear mechanism 4 comprising a small sun gear 5, a large sun gear 6 which is located axially adjacent to the small sun gear 5, short pinion gears 7 engaged with the small sun gear 5, long pinion gears 8 engaged with the large sun gear 6 and a ring gear 9 engaged with the long pinion gears 8. The pinion gears 7 and 8 are carried by a rear pinion carrier 15. The planetary gear mechanism 4 is of a well known type and widely adopted in vehicle automatic transmissions so that further explanations will be omitted.

The small sun gear 5 is connected through a forward clutch 10 with the output shaft 2e of the torque converter 2. The sun gear 5 is further connected with the output shaft 2e of the torque converter 2 through a coasting clutch 11 and a first one-way clutch 12 which functions to prevent a rotation of the sun gear 5 from being transmitted to the torque converter output shaft 2e.

The large sun gear 6 is connected with the output shaft 2e of the torque converter 2 through a 2-4 brake 13 on one hand and a reverse clutch 14. A shown, the 2-4 brake 13 is located rearward the sun gear 6 and the reverse clutch 14 is located further rearward the 2-4 brake 13. The long pinion gear 8 is mounted on the rear pinion carrier 15 and a low and reverse brake 16 is provided between the rear pinion carrier 15 and the transmission casing. Between the rear pinion carrier 15 and the transmission casing, there is further provided a second one-way clutch 17 which allows a rotation of the rear pinion carrier 15 in the direction of the rotation of the engine output shaft 1. The long pinion gear 8 is further connected at the forward end portion with the output shaft 2e of the torque converter 2 through a 3-4 clutch 19. The ring gear 9 is connected with an output gear 20 which is located forward the ring gear 9. The torque converter 2 is provided with a lock up clutch 21 which functions to connect the output shaft 2e of the torque converter 2 with the engine output shaft 1. As conventional in the art, the transmission is provided with an oil pump 22 which is adapted to be driven by the engine output shaft 1 through an intermediate shaft 23. The transmission shown in FIG. 1 provides four forward drive gear stages and one reverse gear stage. Further, a hydraulic control circuit is provided with a selector lever having a P position, R range, N position, D range, 2 range and 1 range as conventional in the art. An appropriate gear stage is selected in any of the aforementioned ranges by appropriately engaging the clutches and the brakes as shown in the table.

|   |   | reverse clutch | coasting clutch | forward clutch | 3-4 clutch | low & rev | 2-4 brake | 1st one way | 2nd one way |
|---|---|---|---|---|---|---|---|---|---|
| P |   |   |   |   |   |   |   |   |   |
| R |   | O |   |   |   | O |   |   |   |
| N |   |   |   |   |   |   |   |   |   |
| D | 1st |   |   O | O |   |   |   | (O) | (O) |
|   | 2nd |   | O | O |   |   | O | (O) |   |
|   | 3rd |   | O | O | O |   |   | (O) |   |
|   | OD |   | O |   | O |   | O |   |   |
| 2 | 1st |   | O | O |   |   |   | (O) | (O) |
|   | 2nd |   | O | O |   |   | O | (O) |   |
|   | 3rd |   | O | O | O |   |   | (O) |   |
| 1 | 1st |   | O | O |   | O |   | (O) | (O) |
|   | 2nd |   | O | O | O |   |   | (O) |   |

Figure 2:
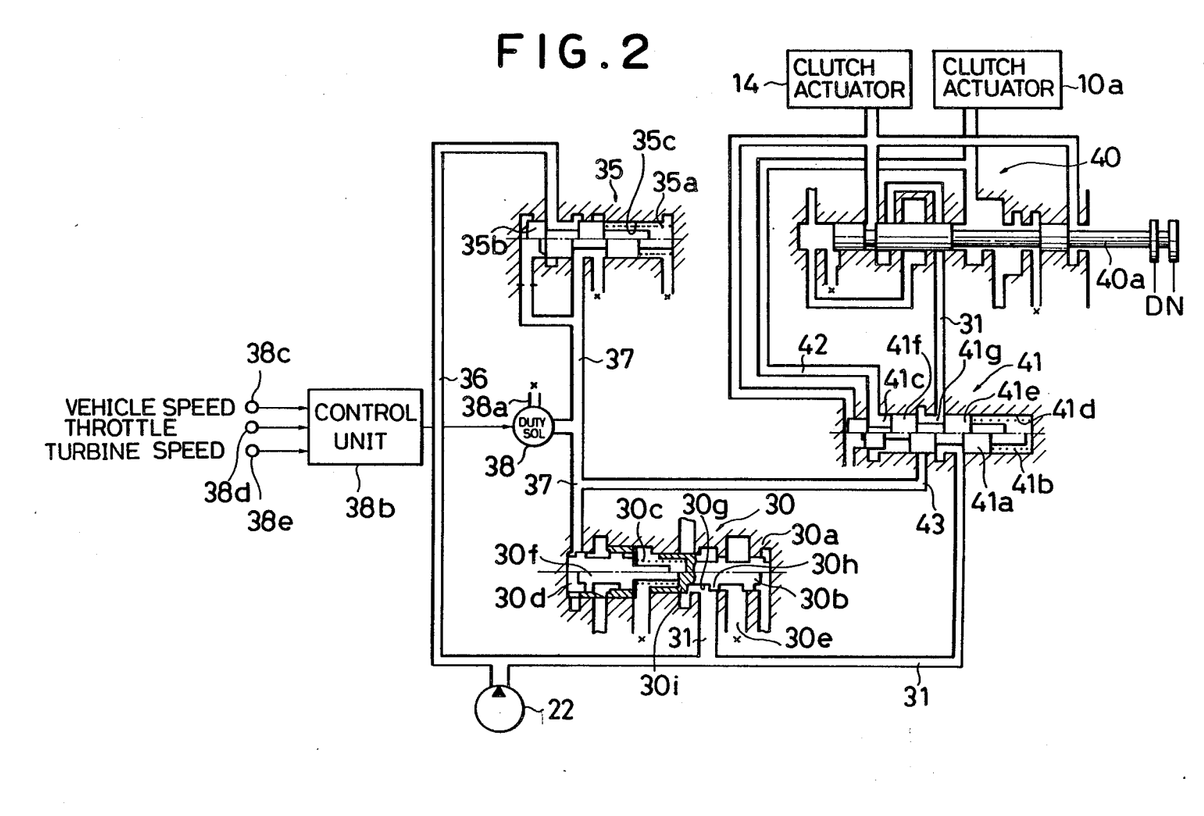
FIG. 2 is a hydraulic circuit diagram of a hydraulic control system for the transmission in accordance with one embodiment of present invention.

Referring now to FIG. 2 which shows a part of the hydraulic control circuit, there is shown a pressure regulator 30 having a valve bore 30a and a valve spool 30b which is axially slidable in the valve bore 30a. In the valve bore 30a, there is further provided a pilot valve spool 30f which is located axially left side of the valve spool 30b. Between the valve spools 30b and 30f, there is a biasing spring 30c which functions to bias the valve spool 30b toward the right in the plane of FIG. 2.

The valve spool 30b has a peripheral groove 30g defined between a small diameter land 30h and a large diameter land 30i. A hydraulic passage 31 from the hydraulic pump 22 is connected with the valve bore 30a to open at the groove 30g in the valve spool 30b to thereby introduce a hydraulic pump pressure into the groove 30g. The large diameter land 30i is located left side the small diameter land 30h so that the hydraulic pressure introduced into the groove 30g functions to bias the valve spool 30b toward left. At the left side of the pilot spool 30f, there is formed a pilot pressure chamber 30d so that the pilot pressure drawn into the chamber 30d functions to force the pilot spool 30f and therefore the valve spool 30b toward the right. The valve bore 30a is formed with a drain port 30e which is located so that the groove 30g in the valve spool 30b is opened to the drain port 30e when the valve spool 30b is shifted toward left. It will therefore be understood that when the pressure in the groove 30g increases to a value which overcomes the pilot pressure in the chamber 30d, the pressure in the groove 30g is partially drained. Thus, there is established in the hydraulic passage 31 a pressure which is proportional to the pilot pressure in the chamber 30d.

In order to provide the pilot pressure, there is provided a pressure reducing valve 35 which includes a valve spool 35b axially slidable in a valve bore 35c. A biasing spring 35a is provided to force the valve spool 35b in one axial direction. A hydraulic passage 36 from the hydraulic pump 22 is connected with the pressure reducing valve 35 which functions to produce in a hydraulic passage 37 a pressure lower than the pump output pressure. The hydraulic passage 37 is connected with the pilot pressure chamber 30d. In the passage 37 leading to the pilot pressure chamber 30d, there is provided a duty factor solenoid valve 38. The solenoid valve 38 has a drain port 38a and is connected with a control unit 38b which can be embodied in the form of a microprocessor. The control unit 38b is connected with detectors which function to detect factors representing vehicle operating conditions. In the embodiment which is being described, there are provided a vehicle speed sensor 38c, an engine throttle valve position sensor 38d and a torque converter turbine speed sensor 38e. The detection signals from the sensors 38c, 38d and 38e are applied to the control unit 38b which then produces an output in accordance with the signals from the sensors to control the solenoid valve 38. It will therefore be understood that there is produced in the passage 37 a pilot pressure regulated in accordance with the vehicle operating conditions.

The hydraulic passage 37 is connected through a manual selector valve 40 with a servo-actuator 10a or the forward clutch 10 and a servo-actuator 14a for the reverse clutch 14. Between the pressure regulating valve 30 and the manual selector valve 40, there is provided a switching valve 41. The manual selector valve 40 includes a valve spool 40a which is manually moved to one of a neutral position N, a reverse position R, a park position P, a drive position D, a position 2 and a position 1. In the position N, the passage 31 is blocked from the communication with the actuators 10a and 14a. In either of the positions D, 2 and 1, the passage is opened to communicate with the actuator 10a.

The passage 37 is connected through a passage 43 with the switching valve 41. The valve 41 has a spool 41a which is slidable in a valve bore 41d and provided with a pair of lands 41e and 41f and a groove 41g defined between the lands 41e and 41f. The passage 31 from the regulating valve 30 is opened to the valve bore 41d in the vicinity of the land 41e which is located rightward the land 41f and the passage 43 from the passage 37 is opened in the vicinity of the land 41f. The passage 31 to the selector valve 40 is opened to the valve bore 41d between the lands 41e and 41f. A biasing spring 41b is provided to apply to the valve spool 41a an axial biasing force directed toward left as seen in the plane of FIG. 2. At the left side of the land 41f, there is provided a pressure chamber 41c which is connected with the actuator 10a so that the pressure in the actuator 10a is introduced into the chamber 41c. It will therefore be understood that in case where the pressure in the chamber is lower than the biasing force of the spring 41b the spool 41a is forced under the spring biasing force toward left to take a leftward position as shown in an upper half part. In this leftward position, the passage 43 from the passage 37 is opened to the groove 41g between the lands 41e and 41f so that the pilot pressure in the passage 37 is drawn through the selector valve 40 into the actuator 10a. Where the pressure in the chamber 41c is greater than the biasing force of the spring 41b, the spool 41a of the switching valve 41 is shifted toward right against the influence of the spring 41b to take a rightward position as shown in the lower half. In this position, the passage 31 from the regulator valve 30 is connected with the groove 41g so that the regulated line pressure is introduced through the selector valve 40 into the actuator 10a. The spring 41b has a biasing force which corresponds to a pressure with which the actuator 10a can be operated to engage the forward clutch 10 slowly to avoid any possible shift shock.

Figure 3:
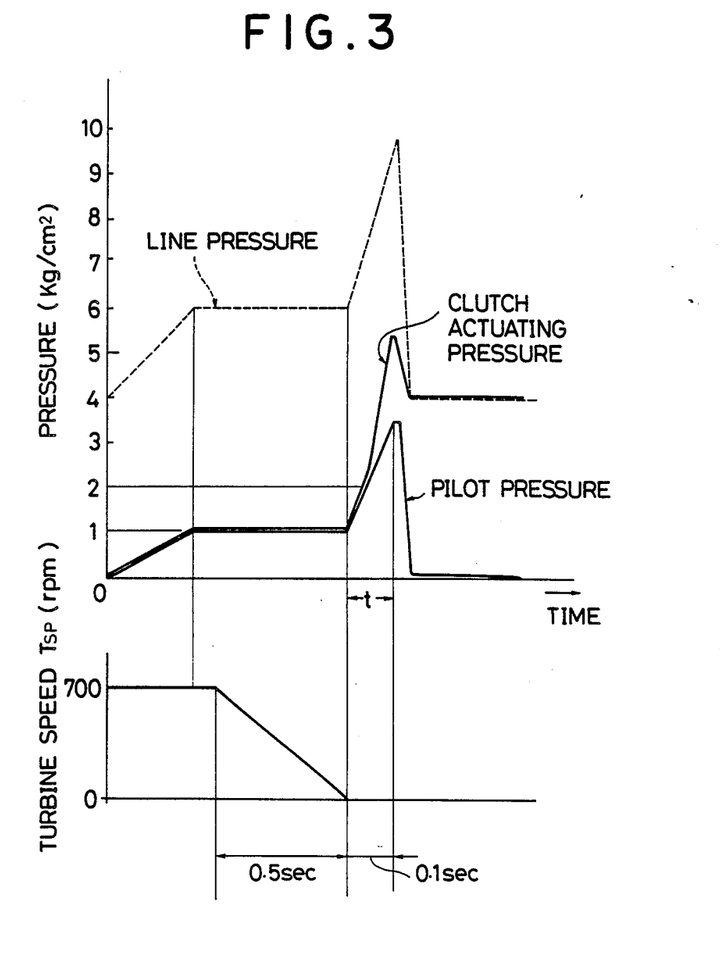
FIG. 3 is a diagram showing changes in various pressures in the hydraulic control system.

When the vehicle is stopped and the selector valve 40 is in the position N, the forward clutch 10 is disengaged. The engine may be idling and the torque converter turbine 2b may be running at an idling speed which may for example be 700 rpm as shown in FIG. 3. At this time, the pilot pressure is not produced in the passage 37. When the selector valve 40 is shifted to the position D to make the vehicle ready for a forward movement, the control unit 38b produces a signal for energizing the solenoid valve 38a to establish the pilot pressure in the passage 37. Thus, the pilot pressure is increased as shown in FIG. 3 to a predetermined value, for example, 1 kg/cm². In response to the increase in the pilot pressure, the regulated line pressure is also increased to a predetermined value.

In this situation, the pilot pressure is not sufficient to overcome the biasing force of the spring 41b so that the valve spool 41a of the switching valve 41 is located in the leftward position. Thus, the pilot pressure is applied to the actuator 10a for the forward clutch 10 to initiate the engagement of the clutch 10. It will be noted in FIG. 3 that the pilot pressure is much lower than the line pressure so that the engagement of the forward clutch 10 will be progressed slower than in a case where the line pressure is used for the engagement of the forward clutch 10 from the beginning.

As the engagement of the forward clutch 10 progresses, the speed of the turbine 2b of the torque converter 2 is decreased to a final value of 0 as shown. At this time, the engagement of the forward clutch 10 is substantially completed and the control unit 38b then produces a signal which is greater than the previous value and may for example be 4 kg/cm². The regulated line pressure is then correspondingly increased. As the pilot pressure increases, the pilot pressure will become larger than the biasing force of the spring 41b so that the spool 41a of the switching valve 41 is shifted to the rightward position to thereby connect the line 31 through the selector valve 40 to the actuator 10a. Thus, the line pressure of a higher value is introduced into the actuator 10a to establish a firm engagement of the forward clutch 10.

Figure 4:
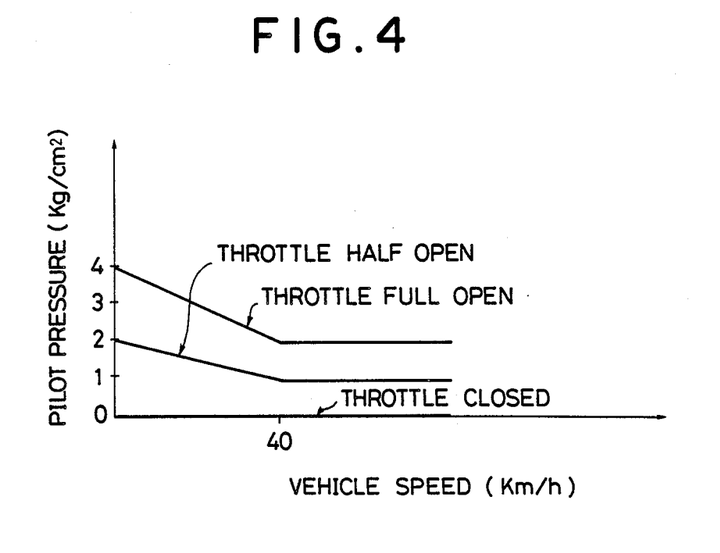
FIG. 4 is a diagram showing an example of determining the pilot pressure.

FIG. 4 shows an example of the control of the pilot pressure during operations of the vehicle. When the forward clutch 10 is engaged and the vehicle is started to run, the pilot pressure is controlled in accordance with the vehicle operating conditions. In the example shown in FIG. 4, the pilot pressure is determined in accordance with the vehicle speed and the engine throttle valve position. The control unit 38b produces an appropriate signal in response to the input signals received from the sensors 38c and 38d so that the pilot pressure is decreased in response to a decrease in the engine throttle valve opening and in response to an increase in the vehicle speed.

Figure 5:
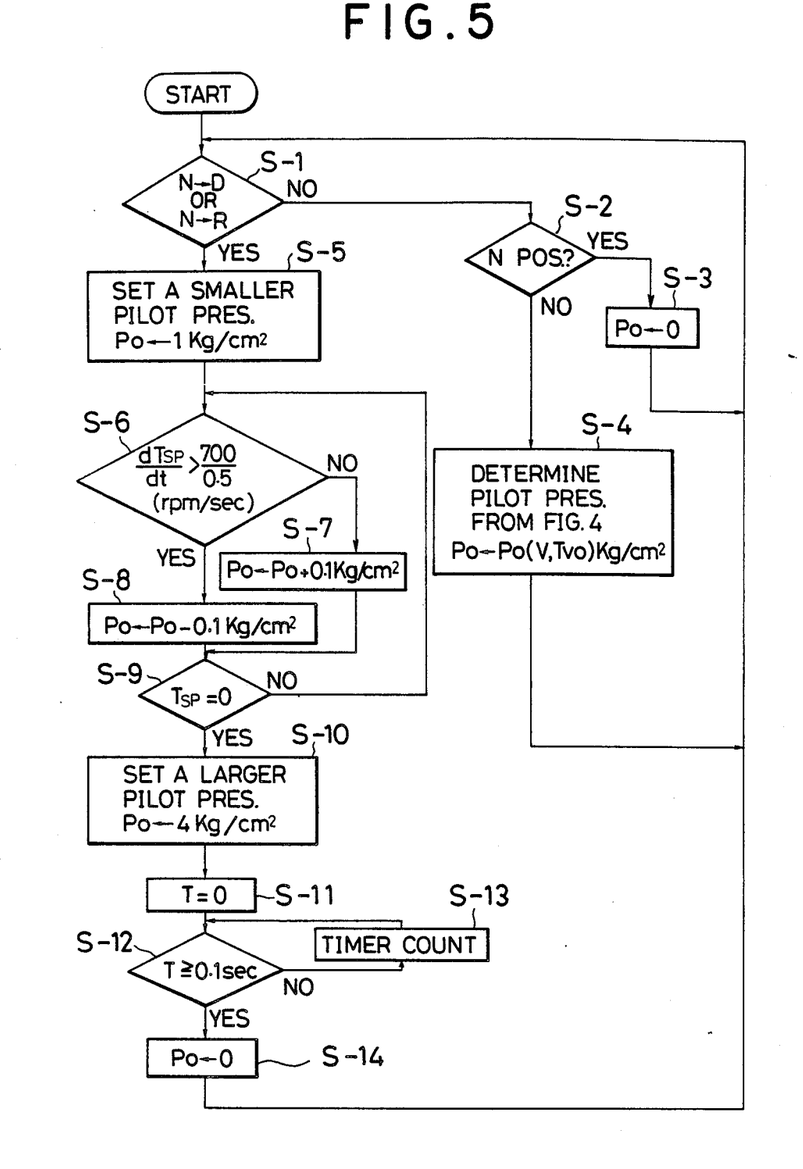
FIG. 5 is a program flow chart showing an example of controlling the pilot pressure; and, FIG. 6 is a program flow chart showing another example of controlling the pilot pressure.

Referring now to FIG. 5, there is shown a flow chart showing the operation of the control unit 38b in providing an appropriate value of the pilot pressure. In the first step s-1, a judgement is made as to whether the selector valve is shifted from the position N to either the position D or R. If the answer is NO, a further judgement is made in the step s-2 as to whether the selector valve is in the position N. If it is judged that the selector valve is in the N position, the pilot pressure is set to 0 in the step s-3. If the selector valve is not in the N position, it is judged that the selector valve has been shifted to one of the running positions in a previous control cycle. Then, the pilot pressure is determined in the step s-4 in accordance with the vehicle operating conditions for example by using the chart in FIG. 4.

If it is judged in the step s-1 that the selector valve is shifted to from the position N to either of the positions D and R, the control unit produces in the step s-5 a signal so that a low pilot pressure, for example 1 kg/cm$^2$ is established. Then, a judgement is made in the step s-6 as to whether the rate of change of the speed of the torque converter turbine 2b is greater than a predetermined value, for example, 700rpm/0.5sec. If the rate is not greater than the predetermined value, a signal is produced in the step s-7 to increase the pilot pressure by a small value, for example, 0.1 kg/cm$^2$. To the contrary, if the rate is greater than the predetermined value, a signal is produced in the step s-8 to decrease the pilot pressure by a small value, for example, 0.1 kg/cm$^2$.

Then, a further judgement is made in the step s-9 as to whether the turbine speed Tsp is 0. If the turbine speed is not 0, the steps s-6, s-7 and s-8 are repeated. If the turbine speed Tsp is 0, the step s-10 is carried out to increase the pilot pressure to a larger value, for example, 4 kg/cm$^2$. Then, the timer count is reset to 0 in the step s-11 and the timer count is read in the step s-12 as to whether the time count is greater than 0.1 sec. If the timer count is not greater than 0.1 second, the step s-13 is carried out to repeat the step s-12. If the timer count is greater than 0.1 second, the pilot pressure is set to 0 in the step s-14.

Figure 6:
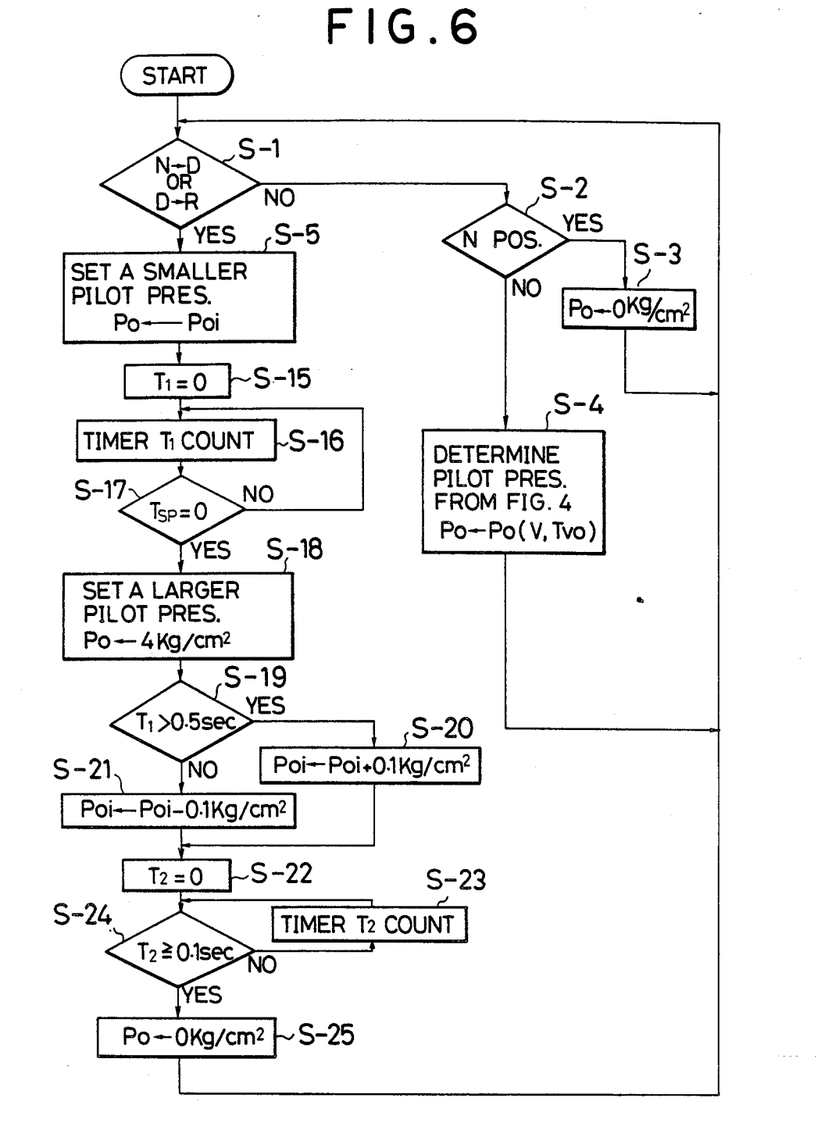

FIG. 6 shows another example of operations of the control unit 38b. In this example, the time $T^1$ required for making the speed of the torque converter turbine 2b is brought to 0 is counter in the steps s-15, s-16 and s-17. Thereafter, the step s-18 is carried out. The step s-18 is the same as the step s-10 in FIG. 5 and provided to increase the pilot pressure to a higher value, for example, 4 kg/cm$^2$. Then, the steps s-19, s-20 and s-21 which consists feedback means for controlling pilot pressure are carried out to increase the pilot pressure by 0.1 kg/cm$^2$ when the time $T^1$ is greater than 0.5 second and to decrease the pilot pressure by 0.1 kg cm$^2$ when the time $T^1$ is not greater than 0.5 second. Thereafter, the steps s-22, s-23, s-24 and s-25 are carried out to effect the same procedures as in the steps s-11, s-12, s-13 and s-14 in the process for FIG. 5. In the procedure shown in FIG. 6, the smaller value of the pilot -[pressure is modified to a value so that the time $T^1$ for bringing the torque converter turbine speed to 0 is maintained at a predetermined value, for example, 0.5 second and the modified value of the small value of the pilot pressure is memorized for use in the next cycle of operations.

The invention has thus been shown and described with reference to specific embodiments, however, it should be noted that the invention is in no way limited to the details of the illustrated structures but changes and modifications may be made without departing from the scope of the appended claims.

We claim:

1. A hydraulic control system for an automatic vehicle transmission including
   hydraulic actuator means for friction means in said transmission,
   means for producing a pilot pressure in accordance with vehicle operating conditions, pressure regulating means for producing a regulated line pressure in accordance with the pilot pressure,
   hydraulic passage means provided between said pressure regulating means and said hydraulic actuator means,
   switching valve means provided in said hydraulic passage means and responsive to said pilot pressure to take a first position wherein it allows the pilot pressure to be applied to the actuator means when the pilot pressure is below a predetermined value and a second position wherein it allows the regulated line pressure to be applied to the actuator means when the pilot pressure is above the predetermined value.

2. A hydraulic control system in accordance with claim 1 in which control valve means is provided in the hydraulic passage means between the switching valve means and the actuator means to control operations of the actuator means.

3. A hydraulic control system in accordance with claim 1 in which said pilot pressure producing means includes solenoid valve means of a duty factor type in which the pressure is determined by the duty factor of the electric pulse applied to the solenoid valve means.

4. A hydraulic control system in accordance with claim 1 which includes control means for maintaining the pilot pressure at a smaller value until the engagement of the friction means is completed and thereafter at a higher value for a predetermined time period.

5. A hydraulic control system in accordance with claim 4 in which said transmission includes a torque converter, said detecting means is means for detecting an output speed of the torque converter.

6. A hydraulic control system in accordance with claim 4 in which said transmission includes a torque converter, feedback means for controlling the pilot pressure to maintain a rate of decrease of an output speed of the torque converter substantially at a predetermined value.

7. A hydraulic control system in accordance with claim 4 in which said transmission includes a torque converter, means for determining said smaller value of the pilot pressure depending on a rate of decrease in an output speed of the torque converter in a previous cycle of operation.

8. A hydraulic control system including
   a multiple stage transmission gear mechanism having friction means,
   a hydraulic control circuit including pilot pressure producing means having solenoid valve means, electronic control means for energizing the solenoid valve means to produce a pilot pressure of a desired value, pressure regulating means responsive to the pilot pressure to produce a regulated line pressure, actuator means for effecting engagement of the friction means, hydraulic passage means for directing the regulated line pressure to said actuator means, switching valve means provided in said passage means for allowing alternately the regulated line pressure and the pilot pressure to pass to the actuator means so that the pilot pressure is passed to the actuator means when the pilot pressure is below a predetermined value and the regulated line pressure is passed to the actuator means when the pilot pressure is above the predetermined value.

* * * * *